Oct. 24, 1950   W. W. KAGI ET AL   2,527,136
FLUID MIXING APPARATUS
Filed Aug. 16, 1946
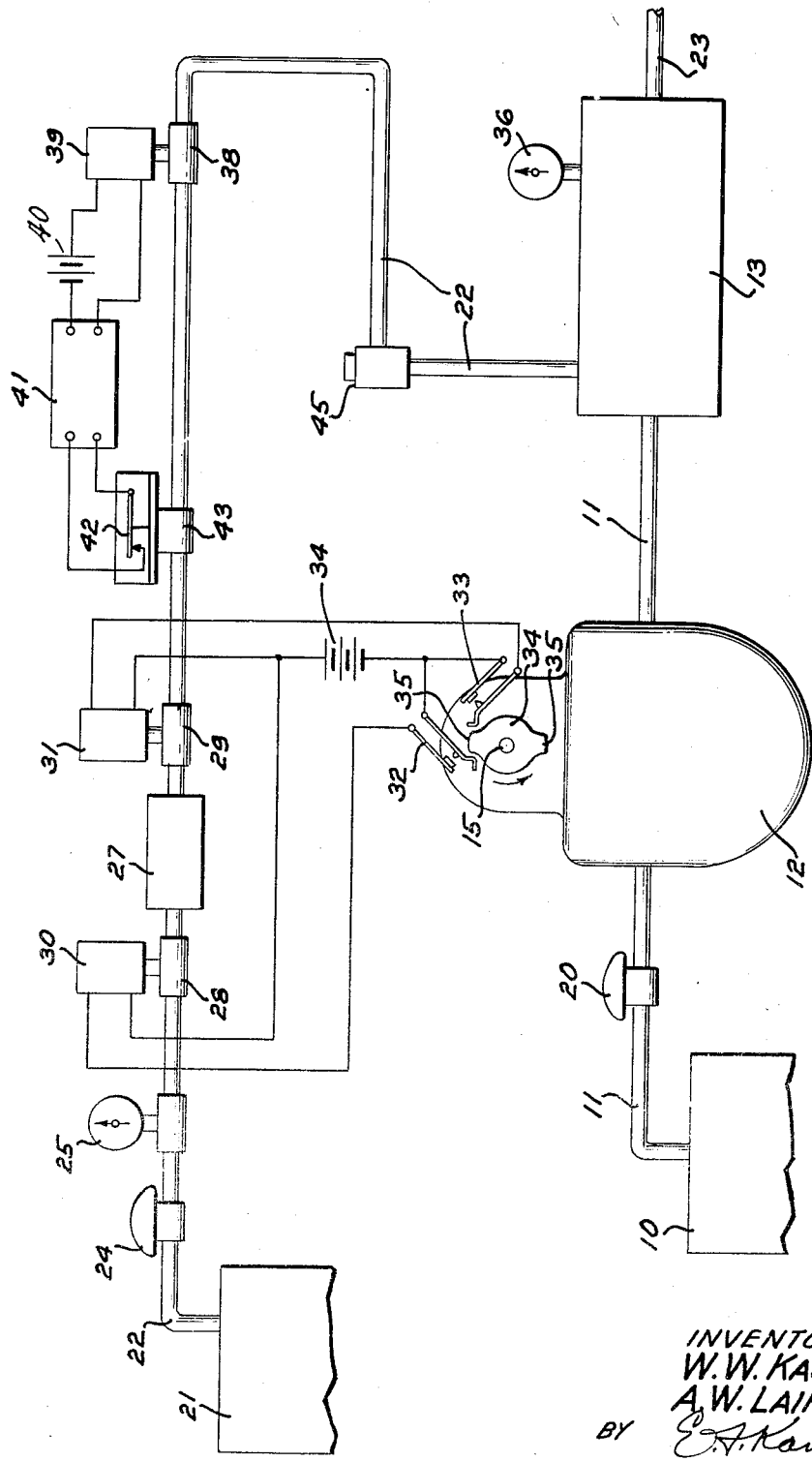
INVENTORS
W. W. KAGI
A. W. LAIRD
BY E. A. Kane
ATTORNEY Patented Oct. 24, 1950

2,527,136

UNITED STATES PATENT OFFICE 2,527,136

FLUID MIXING APPARATUS

Walter W. Kagi, Western Springs, and Alfred W. Laird, Chicago, Ill., assignors to Western Electric Company, Incorporated, New York, N. Y., a corporation of New York Application August 16, 1946, Serial No. 690,926

6 Claims. (Cl. 137—165)

This invention relates to fluid mixing apparatus and more particularly to an apparatus in which a metered flow of one fluid into a mixing chamber controls the feeding at intervals of a measured amount of another fluid into the mixing chamber to obtain the desired proportions of mixed fluids.

In gas mixing apparatus known heretofore as, for instance, the type wherein the gases are mixed by feeding them into a common conduit and where the proportions of the gases mixed are controlled by the pressures of the individual gases and the size of the orifices through which they pass, difficulty has been experienced in obtaining a highly accurate control of the proportioning of the gases mixed.

It is an object of this invention to provide an efficient and effective apparatus for mixing a plurality of fluids and accurately controlling the proportion of the fluids mixed.

In one embodiment of the invention, a fluid mixing apparatus is provided for closely regulating the proportion of two gases wherein one gas, which is to comprise the major constituent of the mixture, is fed at low pressure to a mixing chamber through a flow meter which drives contact-making devices for completing a circuit to alternately actuate a pair of valves disposed in a high pressure line from a gas supply of the gas to comprise the minor constituent of the mixture whereby, when one valve is opened, a charge of the second gas is fed into a measuring chamber intermediate the valves, and, upon closure of said first valve and opening of the second valve, this charge is fed to the mixing chamber. An auxiliary valve may be added to the high pressure line between the measuring and the mixing chambers to shut off the gas from the mixing chamber in response to a continued flow of the high pressure gas through the high pressure line.

A more complete understanding of the invention may be had by reference to the following detailed description and the accompanying drawing in which the single feature is a diagrammatic view of the gas mixing apparatus.

The present apparatus may be used for mixing any two gases together in a definite and controlled proportion. As an example of its use, the apparatus will be described in connection with the mixing of hydrogen with commercially pure nitrogen containing a small proportion of oxygen therein as an impurity as one step in the process of further purifying the nitrogen, other steps in the purifying process including reacting the mixed gases with a catalyst to combine the hydrogen with the oxygen to form water, and removing the water from the nitrogen in the dryer. The hydrogen is mixed with commercially pure nitrogen in various proportions, depending upon the proportion of oxygen contained in the commercially pure nitrogen and for one run of the apparatus the gases were mixed in the proportion of 99.5% nitrogen and .5% hydrogen. In the following description of the invention, the term "nitrogen" will be used to designate commercially pure nitrogen containing therein as an impurity a small proportion of oxygen.

Referring to the drawing, which diagrammatically illustrates the gas mixing apparatus used for mixing nitrogen and hydrogen together in closely regulated proportions, the nitrogen is fed from a source of supply 10, through a line 11 and a gas flow meter 12, into a mixing chamber 13. The gas flow meter may be of any well-known positive displacement type having an indicator shaft 15, which is driven by the passage of the gas through the meter, the extent of rotation being in direct proportion to the volume of gas passed therethrough. The pressure under which gas is fed to the flow meter 12 is maintained at a constant value by a pressure regulating valve 20. Hydrogen is fed to the mixing chamber 13 from a source of supply 21 through the line 22 and the mixed gases may be withdrawn from the mixing chamber through a delivery line 23 and supplied to apparatus (not shown) for further processing. The pressure at which the hydrogen is fed through line 22 to the chamber 13 is maintained at a higher value than that in the nitrogen line 11 by a pressure regulating valve 24 and the pressure in the line 22 is indicated by a gage 25.

A storage or measuring chamber 27 having a predetermined capacity is connected in the line 22 to store a head of gas under pressure to be later fed to the mixing chamber 13. To control the flow of hydrogen gas from the supply 21 into the chamber 27, an electrically operated valve 28 is connected into the line between the chamber 27 and the supply 21. Another electrically operated valve 29 is connected into the line between the chamber 27 and the mixing chamber 13 to control the flow of gas from the storage chamber 27 into the mixing chamber. Valves 28 and 29 may be of the normally closed solenoid operated type, which are opened by the energization of the solenoids 30 and 31, respectively, associated therewith. The solenoids 30 and 31 are connected to a pair of normally open switches 32 and 33, respectively, and to a source of electric current 34. The normally open switches 32 and 33 are angularly disposed relative to each other and are positioned to be actuated by a rotatable cam 34 mounted on the shaft 15 of the flow meter 12. The cam 34 has formed thereon a pair of diametrically opposed lobes 35—35, each of which intermittently engages the switches 32 and 33 to alternately close the switches to cause the solenoids 30 and 31 to be energized alternately. Upon the closing of the switch 32 by the cam lobes 35 and the energization of the solenoid 30, the valve 28 is opened and the hydrogen gas is admitted into the chamber 27. Upon further rotation of the cam 34, the switch 32 will be opened and the solenoid 30 will be deenergized and allow the valve 28 to close to cut off communication between the chamber 27 and the supply 21. As the cam 34 continues to rotate the switch 33 will be closed by the cam lobe 35 and the solenoid 31 energized to open the valve 29. Upon the opening of the valve 29, gas in the metering chamber 27 under a relatively high pressure will be fed into the mixing chamber 13, the pressure of which is substantially that of the nitrogen gas in line 11 and which is indicated by a pressure gage 36. It will be apparent that as a definite volume of nitrogen is fed through the line 11 into the mixing chamber, the flow meter 12 will operate to close and open the switches 32 and 33 to effect the alternate opening and closing of each of the valves 28 and 29 alternately to admit the hydrogen gas into the measuring chamber 27 and then to feed the measured quantity of hydrogen into the mixing chamber 13, there to mix with the nitrogen in a definite predetermined proportion.

To insure that the hydrogen gas should not flow continuously into the mixing chamber in case the valves 28 and 29 do not function properly and remain open, a safety valve 38 is connected into the line 22. The valve 38 may be of the normally closed electrically operated type which is opened by energization of the solenoid 39 associated therewith and which is closed upon deenergization of the solenoid. The solenoid 39 is connected to a source of electric current 40 and through a timer or time delay relay 41 to a normally closed switch 42. The switch 42 is associated with and forms part of a pressure responsive device 43 connected in the line 22 intermediate the valve 38 and the valve 29. The pressure device 43 is set to respond to an increase in pressure of a value between that in the mixing chamber and that in the high pressure line 22 to open the switch 42. If the resistance to the flow of gas in the line 22 between the chamber 27 and the mixing chamber 13 is not enough to create a back pressure sufficient to operate the pressure device 43 when a charge of gas is released from the chamber 27, a valve 45 having an adjustable orifice therein may be connected in the line 22 between the valve 38 and the mixing chamber 13. The valve 45 may be adjusted to provide the proper resistance to the flow of gas therethrough to build up a back pressure of the gas in the line 22 sufficient to actuate the pressure device 43 when a charge of hydrogen gas passes therethrough and still allow the pressure of the charge of hydrogen gas to be reduced in time to prevent the delayed actuation of the valve 38 through the timer 41.

The timer 41 interposes a time delay between the opening of the switch 42 and the opening of the circuit from the timer to the solenoid 39 so that the solenoid 39 is not immediately deenergized but becomes deenergized only if the switch 42 is held open longer than a predetermined length of time determined by the setting of the timer 41. Thus during normal operation of the apparatus when the valve 29 is opened and the gas in the chamber 27 surges into the mixing chamber 13, due to the temporary increase in pressure the pressure responsive device 43 will be actuated to open the switch 42. The pressure in the line 22 between the mixing chamber 13 and the chamber 27 will quickly decrease as the pressures in the mixing chamber and the measuring chamber are equalized and the switch 42 is closed before the timer 41 permits the solenoid 39 to become deenergized to allow the valve 38 to close. Should the valves 28 and 29 remain open and allow the free passage of hydrogen through the line 22, the pressure of the hydrogen gas would actuate the pressure responsive device 43 and open the switch 42 and keep it open. With the switch 42 open for a predetermined length of time, determined by the timer 41, the circuit to the power source 40 would be opened and the solenoid 39 would be deenergized to allow the valve 38 to close and shut off the flow of hydrogen to the mixing chamber 13. Thus an accurately proportioned mixture of gases will be fed from chamber 13 to the line 23.

Although the invention is described in connection with the mixing of two different gases, it may be used for mixing more than two gases together in closely regulated proportions where the metering means in the low pressure line controls the intermittent feeding of a plurality of gases into the mixing chamber. Also, the invention is not limited to the mixing of a plurality of gases in controlled amounts, but may be used for mixing gases with liquids or for mixing a plurality of liquids.

What is claimed is:

1. A mixing apparatus comprising a gas mixing chamber having a delivery outlet for the mixed gases, a pair of lines for delivering two different gases under different pressures from two sources into the mixing chamber, metering means in the low pressure line actuated in response to the flow of gas into the mixing chamber, a storage chamber connected in the high pressure line, a valve in the high pressure line for controlling the flow of gas into the storage chamber, a valve in the high pressure line for controlling the flow of gas from the storage chamber into the mixing chamber, and actuating means under control of said metering means for alternately actuating said valves intermittently to feed predetermined amounts of said high pressure gas into the mixing chamber.

2. A gas mixing apparatus comprising a mixing chamber having a delivery outlet for the mixed gases, a low pressure line for feeding one gas from a supply into the mixing chamber, a high pressure line for feeding another gas from a supply into the mixing chamber, a positive displacement flow meter in the low pressure line, control means driven by the flow meter, a storage chamber connected in the high pressure line, valve means in the high pressure line operable in one position to disconnect the mixing chamber from the storage chamber and to connect the supply to the storage chamber and in another position to disconnect the supply from the storage chamber and to connect the mixing chamber to the storage chamber, and means operable under control of said control means for actuating said valve means whereby predetermined volumes of high pressure gas are intermittently fed into the mixing chamber to mix with said low pressure gas in a definite proportion.

3. A gas mixing apparatus comprising a mixing chamber, a supply chamber for a low pressure gas, means for conducting said low pressure gas from said supply chamber to said mixing chamber, means in said conducting means for metering the flow of said low pressure gas to said mixing chamber, a supply chamber for a high pressure gas, means for conducting said high pressure gas from said supply chamber to said mixing chamber, a storage chamber connected in said conducting means between said high pressure supply chamber and mixing chamber, valve means in said means for conducting said high pressure gas operable to establish and disestablish communication alternately between said storage chamber and said high pressure supply chamber and between said storage chamber and said mixing chamber, and means under control of said metering means to actuate said valve means to effect the intermittent feeding of predetermined amounts of said high pressure gas into said mixing chamber.

4. A gas mixing apparatus comprising a gas mixing chamber having a delivery outlet for the mixed gases, a pair of lines for delivering two different gases into the mixing chamber under different pressures, a positive displacement flow meter in the low pressure line having contact making devices alternately actuated thereby in response to the flow of gas in the low pressure line, a measuring chamber connected in the high pressure line, a normally closed valve in the high pressure line for controlling the flow of gas into the measuring chamber, a solenoid for actuating said valve to open position, a normally closed valve in the high pressure line for controlling the flow of gas from the measuring chamber into the mixing chamber, a solenoid for actuating said last named valve to open position, and electrical means interconnecting said solenoids and said contact making devices for alternately energizing said solenoids to alternately open said valves in response to the actuation of said contact making devices to effect the feeding of predetermined amounts of said high pressure gas at intervals into the mixing chamber.

5. A mixing apparatus comprising a mixing chamber having a delivery outlet for the mixed gases, a pair of lines for delivering two different gases from two sources of supply into the mixing chamber under different pressures, metering means in the low pressure line actuated in response to the flow of gas into the mixing chamber, a measuring chamber connected in the high pressure line, a valve in a high pressure line for controlling the flow of gas into the measuring chamber, a valve in the high pressure line for controlling the flow of gas from the measuring chamber into the mixing chamber, actuating means under control of said metering means for alternately actuating said valves to feed intermittently predetermined amounts of said high pressure gas into the mixing chamber, a pressure responsive device in the high pressure line between the mixing chamber and the valve which controls flow from the measuring chamber, a safety valve in the high pressure line between the mixing chamber and the pressure responsive device, said safety valve being movable to and from open and closed positions and operable in said closed position to stop the flow of gas from said measuring chamber to said mixing chamber, electrical means for holding said valve in open position, and means including a time delay device interconnecting said pressure-responsive device and said means for holding said valve in open position operable in response to the actuation of said pressure-responsive device for a predetermined length of time to render inoperative said valve holding means and thereby effect the closing of said valve.

6. A gas mixing apparatus comprising a mixing chamber having a delivery outlet for the mixed gases, a low pressure line for feeding one gas from a supply into the mixing chamber, a high pressure line for feeding another gas from a high pressure supply into the mixing chamber, a positive displacement flow meter in the low pressure line, a measuring chamber connected in the high pressure line, valve means in the high pressure line operable to connect and disconnect said measuring chamber to and from said high pressure gas supply and said mixing chamber, means operable under control of said flow meter for actuating said valve means to connect and disconnect said measuring chamber alternately to and from said high pressure gas supply and said mixing chamber whereby predetermined volumes of high pressure gas are intermittently fed into the mixing chamber to mix with said low pressure gas in a definite proportion, a normally closed safety valve in the high pressure line between the mixing chamber and the valve means movable to and from open and closed positions and operable in said closed position to stop the flow of gas from said measuring chamber to said mixing chamber, means for holding said safety valve in open position, and means including a pressure responsive device connected in the high pressure line between the safety valve and the measuring chamber for rendering inoperative said means for holding said safety valve open.

WALTER W. KAGI.
ALFRED W. LAIRD.

REFERENCES CITED

The following references are of record in the file of this patent:

UNITED STATES PATENTS

| Number | Name | Date |
|---|---|---|
| 557,538 | Beard | Apr. 7, 1896 |
| 1,635,220 | Palmer | July 20, 1927 |
| 2,064,799 | Jones | Dec. 15, 1936 |
| 2,252,939 | McCoy | Aug. 19, 1941 |
| 2,396,527 | Osborne | Mar. 12, 1946 |